S. K. Hawkins,
Spirit Meter,
No. 61,425. Patented Jan. 22, 1867.
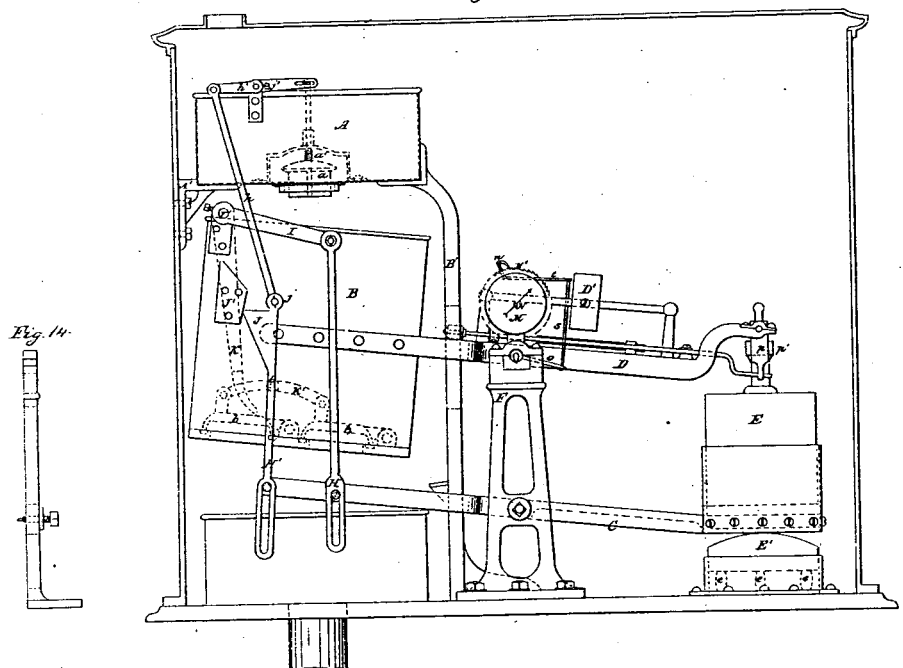
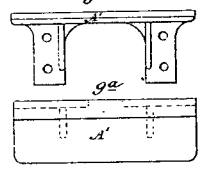
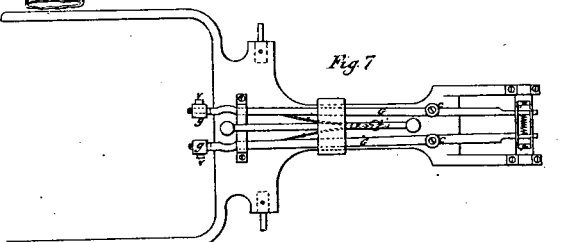
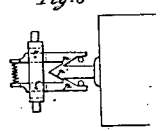
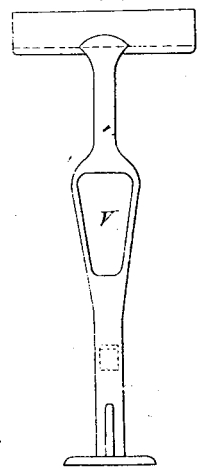
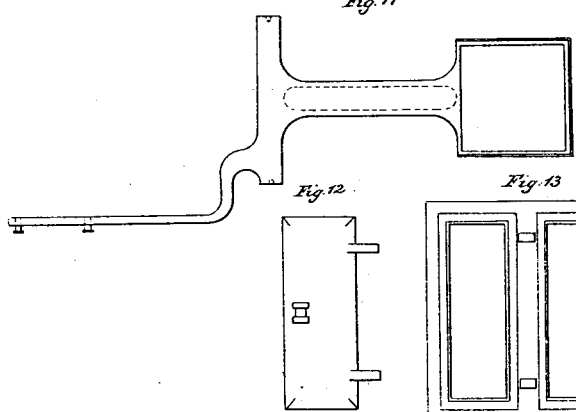
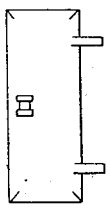
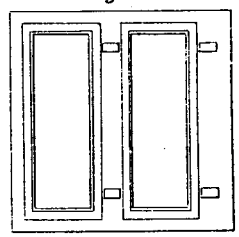

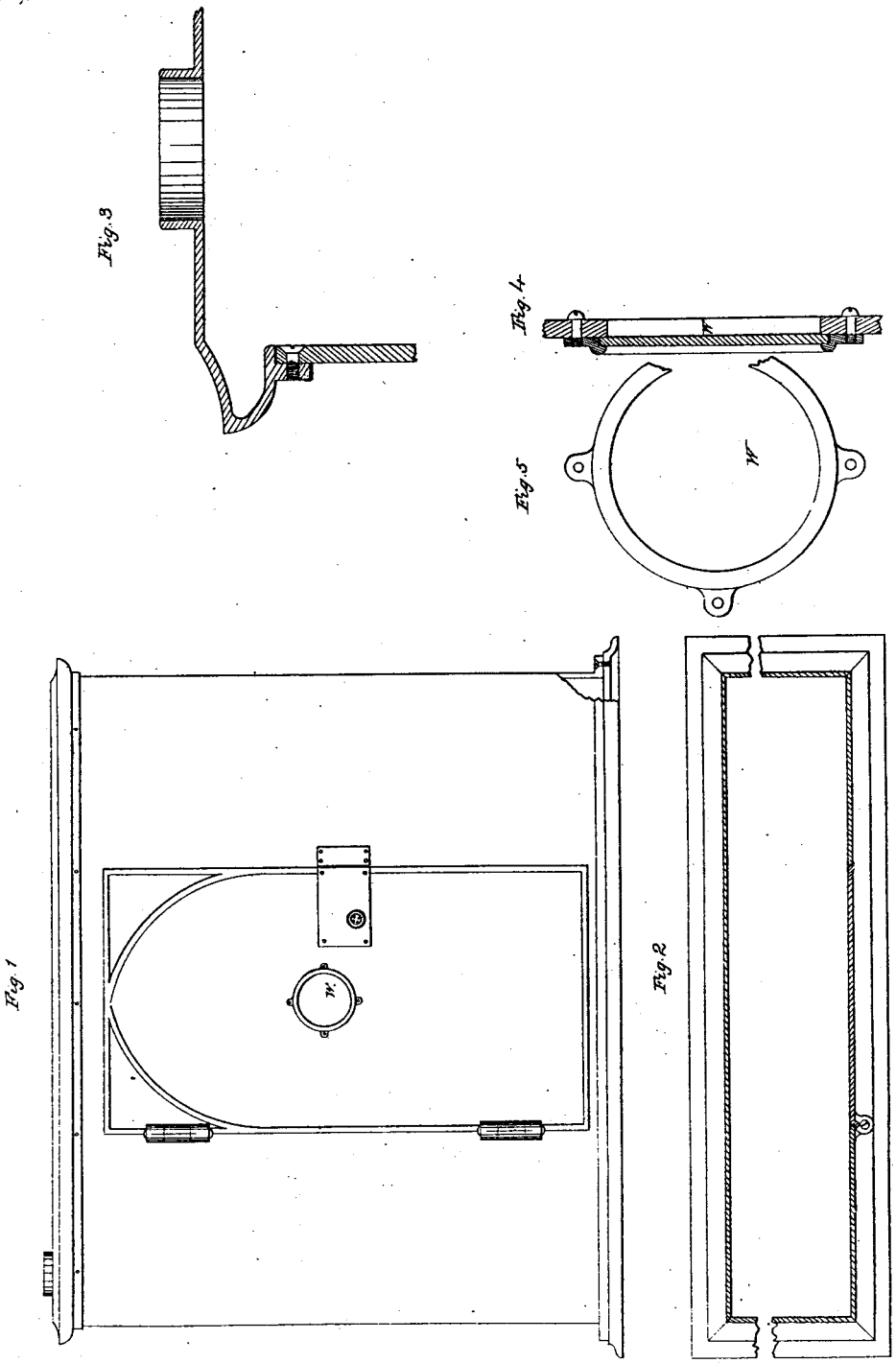

United States Patent Office.

SAMUEL K. HAWKINS, OF LANSINGBURGH, NEW YORK.

Letters Patent No. 61,425, dated January 22, 1867.

---

IMPROVED APPARATUS FOR AUTOMATICALLY WEIGHING SPIRITS AND OTHER LIQUORS.

---

The Schedule referred to in these Letters Patent and making part of the same.

---

TO ALL WHOM IT MAY CONCERN:

Be it known that I, SAMUEL K. HAWKINS, of Lansingburgh, Rensselaer county, and State of New York, have invented a new and useful Apparatus for Automatically Weighing Liquor as it runs from the still; and I do hereby declare that the following is a full, clear, and exact description thereof, reference being had to the accompanying drawings, and to the letters of reference marked thereon.

The nature of my invention consists in a machine which will receive the liquor as it runs from the still, weigh it, pass it off to the cisterns or tanks, and register the weight of the liquor manufactured, all by automatic motions. In the accompanying drawings—

Figure 1 is a side elevation of a case enclosing the weighing apparatus or machine.

Figure 2 is a horizontal section of said case through line x x, fig. 1.

Figure 3 is a section of the upper plate of the casing, full-size.

Figure 4 is a section of the window in the door of the casing, full size.

Figure 5 is an elevation of the window.

Figure 6 is an elevation of the weighing machine, with the front plate of the casing removed.

Figure 7 is a plan of the balance-lever D, with working attachments.

Figure 8 is an end view of the griping-levers G G.

Figure 9 is a front view of a supporting bracket, A'; and

Figure 9* is a top view of the same.

Figure 10 is a front elevation of a supporting column, B.'

Figure 11 is a plan view of lower lever C.

Figure 12 is a plan view of one of the valves for the weighing tank.

Figure 13 is a plan of the bottom of the weighing tank, with valve-seats; and

Figure 14 is an edge view of one of the standards which support the balance-levers.

Like letters designate the same parts in all the figures.

A is the receiving tank, which receives the liquor as it runs from the still; and $a$ is a valve in the bottom of said tank, through which the liquor is discharged into the measuring or weighing tank B. D is a balance-lever, to one end of which the weighing tank B is attached; and D' is a sliding weight on the other end of said balance-lever, to cause it to tilt and elevate the weighing tank, when the liquor is discharged therefrom. C is the lower lever, one end of which supports the weight E when detached from the weighing beam or balance-lever D, and the other end of which, by means of connecting-bars, H and H', operates the valves in the bottoms of the receiving and weighing tanks. E' is the platform on which the outer end of lever C rests, when the weight E, being detached from the weighing beam D, presses upon it; and it is made slightly yielding by being mounted on elastic springs or cushions $e$ $e$ $e$. G G are two griping-bars or levers, mounted on the weighing beam or balance-lever D, pivoted thereto at $c$ $c$. $g$ $g$ are friction-rollers on the other ends of said griping-bars; and V, fig. 10, is a V-shaped opening or slot in the supporting column B', in which the inner ends of the griping-levers G G move. $p$ $p$ are pendent clutch-hooks, mounted on the outer end of the weighing beam D, turning on pivots $r$ $r$, and embracing the outer ends of griping-bars G G; and $p'$ is the stem by which the weight E is raised when seized by said clutch-hooks. H is a connecting-bar, connecting the inner end of the lower lever C with an arm, I, rigidly attached to a rock-shaft, I', which supports and operates the hook-shaft K, to raise the valves $b$ $b$ in the bottom of the weighing tank B, by pressing upwards upon a pin, $l$, in the connecting-bar or bail K' attached to both of said valves. H' and $h$ are connecting-bars between the inner end of lever C and lever $h'$, mounted on the receiving tank A, and operating the valve $a$ in its bottom. J is a projecting incline on connecting-bar H', which engages with a similar projecting incline, J', on the side of the weighing tank as said tank rises, and by that means opens the valve $a$ in the bottom of the receiving tank at the proper time to discharge its contents into the weighing tank. M is a fixed dial-plate, the index of which, $m$, is mounted on a revolving shaft, N, on which is also mounted a ratchet-wheel, N'. This ratchet-wheel is moved by means of a pawl, $n$; which pawl is operated by means of an arm, O, projecting from the rock-shaft on which the balance-lever D oscillates, being connected therewith by means of connecting-rods $s$ $t$, and so geared as to move the ratchet-wheel the space of one tooth at each descent of the weighing tank, and the index on the dial-face a corresponding distance. The weight B should be adjusted to weigh a given amount of liquor at a time, say five gallons.

The operation of the machine is as follows: The liquor is introduced into the receiving tank A in a continuous stream. When the weighing tank B is elevated, as shown in fig. 6 of the drawings, the valve $a$ in the bottom of the receiving tank will be open, and the valves $b\ b$ in the bottom of the weighing tank will be closed. The liquor will flow down from the receiving tank into the weighing tank until the latter begins to descend. As said weighing tank begins to descend, the pendent clutch-hooks $p\ p$ will seize the ratchet-toothed stem of the weight E, and elevate said weight as the tank continues to descend. At the same time the inner ends of the griping-bars G G will press against the inclined sides of the V-shaped slot V, and be thereby gradually drawn together, while their outer ends will spread apart, pressing the pendent clutch-hooks $p\ p$ asunder; and by the time said weighing tank has completed its descent said pendent clutch-hooks will have been spread so far asunder as to release their hold upon the stem of the weight E, and allow said weight to fall upon the outer end of lever C. Said lever C is nearly balanced on its fulcrum, the inner end, however, slightly preponderating, so that when the weight E is raised, the outer end of said lever C will follow the weight in its ascent; but when the weight E drops upon the outer end of said lever C it suddenly descends, the inner end at the same time rising and carrying up connecting-bar H; which, elevating the end of bar I, to which it is pivoted, causes the rock-shaft I' to partially rotate, and the hook-shaft K to press against the lower side of the pin $l$, and raise the valves $b\ b$ in the bottom of the weighing tank, allowing the liquor to escape therefrom. By the same motion of the lower lever C the connecting-bar H' is raised upward, allowing the valve $a$ in the bottom of the receiving tank to be closed by means of the spiral spring $a'$; but, before the weighing tank has quite completed its ascent, the projection J on connecting-bar H' strikes the lower inclined plane of J', which throws out the knee $j$, causing the connecting-bar $h$ to depress the end of lever $h'$, to which it is pivoted, and thereby raise the valve $a$ at the proper time to admit the liquor again into the weighing tank. As the weighing tank descends, the rock-shaft upon which the balance-lever D oscillates will turn, so as to carry up the outer end of arm O, which, by means of connecting-rod $s$, will elevate the end of bent lever $t$, and cause the pawl $n$ to pass back the space of one tooth on the ratchet-wheel N'; and as the weighing tank ascends, by a reverse motion of the bar O, the pawl $n$ will be made to engage with a new tooth on the ratchet-wheel, and move said wheel the space of one tooth, causing the index on the dial-plate to move a corresponding distance. By means of suitable marks on the dial-plate the index is thus made to register each discharge of the contents of the weighing tank. W is a glass window in the door of the outer casing, set opposite the dial-plate, through which the registrations of the index can at all times be seen.

Having thus described my invention, and its mode of operation, what I claim as new, and desire to secure by Letters Patent, is—

1. The automatic weighing machine, constructed and operating substantially as and for the purpose herein described.

2. In combination with the levers D and C and the clutch-hooks $p\ p$, I claim the drop-weight E, so arranged that the clutch hooks will alternately lift and drop the weight, substantially as and for the purpose described.

3. The combination of the balance-levers D and C with the mechanism for operating the valves $a$ and $b\ b$, substantially as described.

4. The combination of the balance-lever D, the griping-bars G G, the clutch-hooks $p\ p$, the weight E, and the V-shaped slot V, constructed and operating substantially as described.

5. The dial-plate M, in combination with the index $m$, the ratchet-wheel N', the pawl $n$, and the arm O, operated by a rock-shaft, substantially as and for the purpose described.

6. In combination with the balance-lever D and its attachments I claim the sliding weight D', substantially as and for the purpose described.

7. In combination with the lower lever C and the drop-weight E, I claim the elastic platform E', substantially as and for the purpose described.

8. In combination with the lower lever C, the connecting-bars H' and $h$, the lever $h'$, and the valve $a$, I claim the inclines J and J', constructed and operating substantially as and for the purpose described.

SAMUEL K. HAWKINS.

Witnesses:
J. J. COOMBS,
JOS. L. COOMBS.